United States Patent
Müller et al.

(10) Patent No.: US 7,865,719 B2
(45) Date of Patent: Jan. 4, 2011

(54) METHOD FOR ESTABLISHING THE AUTHENTICITY OF THE IDENTITY OF A SERVICE USER AND DEVICE FOR CARRYING OUT THE METHOD

(75) Inventors: Christian Müller, Dusseldorf (DE); Alexis Trolin, Berlin (DE); Siegfried Ergezinger, Mettmann (DE); Anita Döhler, Mettmann (DE)

(73) Assignee: E-Plus Mobilfunk GmbH & Co. KG, Dusseldorf (DE)

( * ) Notice: Subject to any disclaimer, the term of this patent is extended or adjusted under 35 U.S.C. 154(b) by 1137 days.

(21) Appl. No.: 10/204,473

(22) PCT Filed: Feb. 10, 2001

(86) PCT No.: PCT/EP01/01469

§ 371 (c)(1),
(2), (4) Date: May 1, 2003

(87) PCT Pub. No.: WO01/62016

PCT Pub. Date: Aug. 23, 2001

(65) Prior Publication Data

US 2003/0159031 A1    Aug. 21, 2003

(30) Foreign Application Priority Data

Feb. 21, 2000 (DE) .................. 100 07 807

(51) Int. Cl.
*H04L 9/00* (2006.01)

(52) U.S. Cl. .............. 713/155; 726/5; 726/19
(58) Field of Classification Search ............ 713/1, 713/2, 188, 194, 155; 380/200, 201, 255, 380/277; 726/2, 5–7, 10, 18–19
See application file for complete search history.

(56) References Cited

U.S. PATENT DOCUMENTS

| | | | |
|---|---|---|---|
| 5,732,137 A * | 3/1998 | Aziz | 713/155 |
| 5,875,394 A | 2/1999 | Daly et al. | |
| 5,881,226 A * | 3/1999 | Veneklase | 726/16 |
| 6,112,078 A * | 8/2000 | Sormunen et al. | 455/411 |
| 6,230,272 B1 * | 5/2001 | Lockhart et al. | 726/2 |
| 6,237,093 B1 * | 5/2001 | Vatanen | 713/162 |
| 6,427,071 B1 * | 7/2002 | Adams et al. | 455/403 |
| 6,708,200 B1 | 3/2004 | Ura et al. | |
| 2003/0005144 A1 * | 1/2003 | Engel et al. | 709/235 |

FOREIGN PATENT DOCUMENTS

| | | |
|---|---|---|
| DE | 19722424 | 8/1998 |
| JP | 2000-010927 | 1/2000 |
| JP | 2000-188616 | 7/2000 |
| JP | 2000-312267 | 11/2000 |

* cited by examiner

*Primary Examiner*—Kimyen Vu
*Assistant Examiner*—Joseph Pan
(74) *Attorney, Agent, or Firm*—Dorsey & Whitney LLP

(57) ABSTRACT

The invention relates to a process and a device for establishing the authenticity of the identity of a service user relative to a service provider for release of an access authorization (password) for a service using two different data input terminals, a registration server and a message converter.

10 Claims, 1 Drawing Sheet

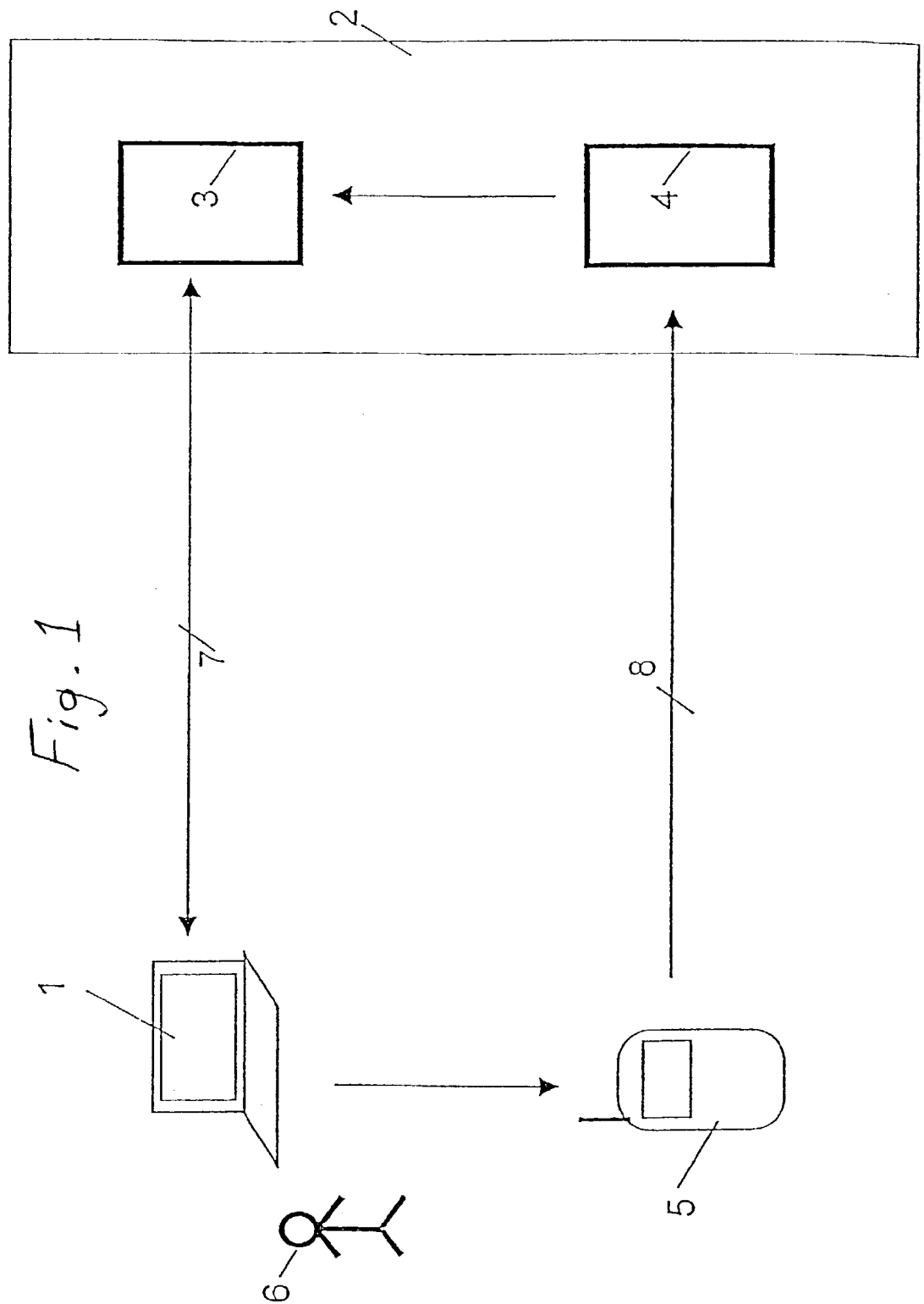

METHOD FOR ESTABLISHING THE AUTHENTICITY OF THE IDENTITY OF A SERVICE USER AND DEVICE FOR CARRYING OUT THE METHOD

The invention relates to a process for establishing the authenticity of the identity of a service user relative to the service provider for release of an access authorization (password) for a service.

The invention furthermore relates to a device for executing the aforementioned process.

PRIOR ART

DE 197 18 103 A1 discloses a process and a device for authorization in data transmission systems using a transaction number (TAN) or a comparable password. The known process calls for the following:

The user in a first step sends via a data input device his identification and/or the identification character of the data input device together with a request to generate or choose a TAN or comparable password from a data file to the authorization computer;

In a second step the authorization computer generates the TAN or comparable password or chooses it from a file;

In the third step the authorization computer sends the TAN or comparable password via a transmission path other than in step 1 to the receiver;

In a fourth step the user accepts this TAN or comparable password from the receiver and inputs it into the data input device;

In a fifth step this TAN or comparable password is transferred again to the authorization computer;

In a sixth step the authorization computer checks the validity of the TAN or comparable password in order to then in a seventh step establish or clear a connection between the data input device and a receiving unit.

Furthermore, it is proposed in a prior publication that the TAN or comparable password is used only once. The validity of the TAN or comparable password can be a predefined user time. Furthermore, the validity of the TAN or comparable password can be dependent on a predefined number of transmitted data files. The validity of the TAN or comparable password is dependent on a predefined amount of transmitted data. Access to the data input device and/or receiver and/or receiving unit is password-protected. The files transferred by the data input device to the receiving unit or vice versa are encrypted. The data transmitted by the data input device to the authorization computer or vice versa are likewise encrypted. The receiver can be a pager. But it is also possible for the receiver to be a mobile device. Furthermore, making the receiver as a fax is suggested. But the receiver can also be an E-mail or network address. Furthermore, it is possible for the receiver to be a data output device. Finally it is proposed that a speech output device be used as a speaker or a telephone be used as the speech output device. It is also described that the receiver is a radio receiver which is installed in the data input device and which outputs the TAN or comparable password on the display or monitor of the data input device. The radio can have a user identification element, as it is also possible for the user identification element to be a magnetic card or chipcard. Finally, it is conceivable for the user identification element to be made with graphic means for checking a fingerprint or for image identification of the user. There are matching encryption modules in the authorization computer and in the receiver. The receiver unit can however also be a door locking mechanism.

Moreover it is proposed that the authorization computer and the receiving unit be integrated in one device. The data input device, the authorization computer and the receiving unit can be made integrated in one device.

Other known procedures such as "telebanking" and the so-called "call back system" described in DE 197 18 103 A1 will be made more reliable by the described procedure.

Since the user in the first step sends via the data input device his identification and/or the identification character of the data input device together with the request to generate and choose a TAN or comparable password from a file to the authorization computer, the third step follows which consists specifically in that the authorization computer sends the TAN or comparable password to the receiver via another transmission path, in the fourth step the user accepting this TAN or comparable password from this receiver and inputting it again into his data input device. Thus two different transmission paths are claimed. The authenticity of the user which is of great importance for the service provider is not checked in the process described in DE 197 18 103 A1.

The process described in DE 197 18 103 A1 allows the possibility of a user providing a false identity with the intent of abuse. Abuse possibilities are the following here:
1. A user logs on under a false identity and has the password sent to the receiver.
2. A user logs on correctly. Due to technical problems the delivery of the password to the receiver is delayed. In the meantime the receiver falls into unauthorized hands.

Since the process is based on a valid password being sent to the receiver, unauthorized use of service to the detriment of the service provider or third party is immediately possible.

DE 197 22 424 C1 discloses a process for secure access by a user to a separate system with data stored in a memory device, with the following steps:

Establishment of a first connection between a first communications means and an access device and transmission of the first password from the first communication means to the access device;

Comparison of the first password to the first authentication data stored in the access device;

Establishment of a second connection between a second communications means and an access device and transmission of the second password from the second communication means to the access device;

Comparison of the second password to the second authentication data stored in the access device; and Release of access to the system with one or both communications means in the presence of a given relation between the first and second password with the second authentication data stored in the access device.

The following steps are also proposed in this connection:

Transmission of the second or third password from the access device to the first communications means;

Transmission of the second or third password from the first communications means to the second communications means;

Transmission of the second or third password from the second communications means to the access device which carries out a corresponding check of the password before access to data is released.

Furthermore, establishment of a connection between a first communications means and an access device and transmission of the first password from the first communication means to the access device is proposed, comparison of the first password to the first authentication data stored in the access device taking place;

In the presence of a given relation between the first password and the authentication data stored in the access device, establishment of a second connection between the access device and the second communications means and transmission of the second password from the access device to the second communication means;

Transmission of the second password from the second communications means to the first communication means;

Transmission of the second password from the first communication means to the access device;

Comparison of the second password to the second authentication data stored in the access device; and Release of access to the system with one or both communications means in the presence of a given relation between the second password and the second authentication data stored in the access device.

Moreover, a process is proposed which is characterized by establishing the first and second connection via communications paths independent of one another, a data processing device being used as the first or second communications means, and the connection between the data processing means and the access device being set up via a data processing device network. An internet can be used for the connection between the access device and the data processing device. A telephone can be used as the first or second communications means, the connection between the telephone and access device being established via the telephone network. A mobile phone can be used as a communications device. The first or second password can be transferred by pressing a call request key or at least one other key of the telephone. The system can be a GSM network and the memory device can be a home location register in which subscriber-referenced data are stored. At least one of the passwords can be produced in the access device or elsewhere and can be valid for only one access session. Furthermore it is proposed that at least one of the passwords be generated using a subscriber identification and the current time or date. One of the passwords can be used for data encryption and for data transmission between the first and second communications means and the access device. After release of data access at least one additional password can be transmitted from one of the communication means to the access device in order to clear expanded access to the system or to other data stored in the memory device. As the device a system with connected access devices can be used, with a data processing device, via a data processing network, to which the access device can be connected, using a permanently connected telephone, with a mobile telephone which can be connected via a fixed network or mobile network to the access device.

This device produces different passwords in a very complicated manner; they are sent via separate communications means.

WO 95/19593 discloses a computer security system in which the system produces case by case a code A which is transformed, and produces a code B, even a third code being generated which is to be compared to the second code and access is only released when the second and third code agree.

OBJECT

The object of the invention is to devise a process for release of access authorization based on checking the authenticity of the identity of a service user according to the assumed type. The process is intended to allow the service provider the security of releasing access authorization for service users whose authenticity has been checked.

Furthermore, the object of the invention is to devise an advantageous device for executing the process as claimed in the invention.

Achieving the Object Relating to the Process

This object is achieved by the features listed in claim 1.

Some Advantages

In contrast to DE 197 18 103 A1, in the invention the identification is sent to the service provider via only one for example secure connection, while the provider sends back the initially still invalid password or the like to the user via the same connection.

The process can be used when access authorization for the use of a service is to be released by the service provider only if beforehand the authenticity of the identity of the service user has been checked with high certainty. Checking the authenticity of the identity of the service user and linking the release of the access identification character to this check greatly reduce the possibility of abuse by providing a false identity.

Misuse is only possible when the terminal device at the time of registration is already in the possession of an authorized party.

OTHER INVENTIVE EMBODIMENTS

Other inventive embodiments are described in claims 2 to 8.

Limitation of the time interval in which the initially invalid password can be used in order to authenticate the service user further increases security by forcing the service user to authenticate himself in the indicated time interval. Authentication after expiration of the time interval is not possible, the service user must re-register in this case and then receives a new invalid password—claim 2.

After the service user has been successfully authenticated and the password has been released to him by the service provider, it will be possible for the service user to change the password at will—claim 3.

To increase security, there is the option of limiting use of the valid password such that the password remains valid for only a predetermined number of uses. When this number is reached, the password is automatically invalidated. Validity is only re-established by the service user again authenticating himself using the process described in claim 1-claim 4.

Encryption offers the service user the advantage that his personal data, for example bank account, credit card number and the like, are not intercepted without authorization by third parties—claim 5.

Encryption offers the service user the advantage that the invalid password and other information of the registration server are not intercepted without authorization by third parties—claim 6.

The GSM standard has high-security methods for ensuring the authenticity of a mobile user. Therefore the transmission of data from the terminal device to the message converter is well suited—claim 7.

To establish identity in the ISDN the so-called "calling line identification" can be used which, according to the prior art, is also used for other purposes as an identity feature—claim 8.

Achieving the Object Relating to the Device

This object is achieved by the features described in claim 9.

Some Advantages

When the process as claimed in claim 9 is used in a mobile network, the following advantages arise for the service user and network operator.

A mobile customer (service user) has a contract with the mobile network operator (service provider) which makes it possible to pay the accruing charges by bank collection by the mobile network operator. When the mobile customer decides to use an Internet service which is likewise offered by the mobile network operator, he must be registered for this service. After registration, the customer will be able to use the service using the access authorization. The use of the service is likewise settled by bank collection. In conjunction with the existing bank collection authorization, to protect the mobile customer and the mobile network operator, it is important to guarantee the authenticity of the identity of the registering service user to preclude abuse. The use of an ISDN network instead of a mobile network allows the same advantage.

The drawings show the invention, in part schematically, on one embodiment.

Reference number 1 labels a data input terminal as the first terminal device which is made here as a PC, while overall reference number 2 labels a service provider which comprises a registration server 3 and a short message service center as the message converter 4.

Reference number 5 labels a second terminal device which is made here as a mobile phone.

The data input terminal 1 as the first terminal device and the second terminal device 5 are both registered for the service user 6 at the service provider 2. This therefore means that the service provider 2 knows the personal data of the service user 6. Thus the terminal device 1 and the terminal device 5 are normally in the possession of the same service user 6.

The data input terminal 1 can be connected via a secure connection 7, for example a secure socket layer, to the registration server 3 of the service provider 2, while the second terminal device 5 can be connected to the message converter 4 via a connection 8, for example via a GSM mobile network or via ISDN or SUS.

The procedure is as follows:

Step 1:
The service user 6 connects via the first terminal device 1, therefore via the data input terminal 1, via the secure connection 7 to the registration server 3 which knows the personal data of the service user 6.

Step 2:
The registration server 3 transfers a still invalid password (identification number, TAN or the like) to the service user 6 to his data input terminal 1 via the same connection 7.

Step 3:
The service user 6 reads the password, the identification number, TAN or the like on his terminal device 1.

Step 4:
The service user 6 sends the password, identification number or the like which has been read according to step 3, via his second terminal device 5 over the connection 8, for example via a GSM mobile network, to the message converter 4.

Step 5:
The service provider 2 checks the password, the identification character or the like which has been sent over the connection 7 to the data input terminal 1 with the password or the like which has been received via the connection 8 from the service user 6. When they agree, the password, the identification character or the like becomes valid and the service user 6 can claim the service of the service provider 2, for example, on the Internet.

The registration server 3 and the message converter 4 can be spatially combined.

Furthermore, it is possible for the data input terminal 1 to relay the password, identification character or the like which has been received over the line 7 from the registration server 3 automatically via a second terminal device 5 and thus via the connection 8 to the message converter 4.

The features described in the abstract, in the claims, and in the specification and shown in the drawings can be significant for the implementation of the invention individually and also in any combinations.

REFERENCE NUMBER LIST

| | |
|---|---|
| 1 | data input terminal, terminal device 1, PC |
| 2 | service provider |
| 3 | registration server |
| 4 | short message service center, message converter |
| 5 | terminal device, second; mobile device; data input terminal |
| 6 | service user |
| 7 | connection, secure |
| 8 | connection; GSM mobile network; ISDN; SUS |
| TAN | transaction number |

LITERATURE

DE 197 18 103 A1
DE 197 22 424 C1
WO 95/19593 A1

The invention claimed is:

1. Process for establishing the authenticity of the identity of a service user relative to a service provider for release of an access authorization for a service, said process comprising:
   establishing a secure first transmission path from a first terminal device, that is registered to the service user, to a registration service of the service provider;
   transferring a request for an access identification character over the first transmission path from the first terminal device to the registration server;
   sending an invalid access identification character over the first transmission path from the registration server to the first terminal device;
   applying the invalid access identification character to a second terminal device which is registered to the service user;
   after the operation of applying the invalid access identification character to a second terminal device, sending the invalid access identification character from the second terminal device over a second transmission path to a message converter of the service provider;
   comparing the invalid access identification character received at the message converter with the invalid access identification character sent to the first terminal device; and
   when the compared invalid access identification characters are the same, establishing validity of the invalid access identification character received at the message converter by releasing the invalid access identification character as valid.

2. Process as claimed in claim 1, further comprising invalidating the access identification character after a predetermined time interval.

3. Process as claimed in claim 1, further comprising allowing the service user to change the access identification character at any time after release of the access identification character.

4. Process as clamed in claim 1, further comprising invalidating the access identification character after a predetermined number of uses.

5. Process as claimed in claim 1, further comprising encrypting the request transferred from the first terminal device to the registration server.

6. Process as claimed in claim 1, further comprising encrypting the invalid access identification character sent from the registration server to the first terminal device.

7. Process as claimed in claim 1, wherein the invalid access identification character sent from the second terminal device to the message converter is transferred according to the GSM/SMS standard.

8. Process as claimed in claim 1, wherein the invalid access identification character sent from the second terminal device to the message converter is transferred via ISDN.

9. Device for executing the process as claimed in claim 1, comprising:
   a first terminal device;
   a registration server;
   a message converter;
   a secure wireless connection, over a secure socket layer, between the first terminal device and the registration server; and
   a mobile connection in the GSM network between the second terminal device and the message converter.

10. Process for establishing the authenticity of the identity of a service user relative to a service provider for release of an access authorization for a service, said process comprising:
   establishing a secure first transmission path from a first terminal device, that is registered to the service user, to a registration service of the service provider;
   transferring a request for an access identification character over the first transmission path from the first terminal device to the registration server;
   sending an invalid access identification character over the first transmission path from the registration server to the first terminal device in a first format;
   applying the invalid access identification character to a second terminal device which is registered to the service user;
   after the operation of applying the invalid access identification character to a second terminal device, sending the invalid access identification character from the second terminal device over a second transmission path to a message converter of the service provider in the first format;
   comparing the invalid access identification character received at the message converter with the invalid access identification character sent to the first terminal device; and
   when the compared invalid access identification characters are the same, establishing validity of the invalid access identification character received at the message converter by releasing the invalid access identification character as valid without changing the first format of the invalid access identification character received at the message converter.

* * * * *